(12) United States Patent
Charbonneau

(10) Patent No.: US 8,057,860 B2
(45) Date of Patent: Nov. 15, 2011

(54) METHOD FOR PRODUCING FIBERGLASS MATERIALS AND COMPOSITIONS RESULTING FROM THE SAME

(75) Inventor: Mark William Charbonneau, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 12/590,970

(22) Filed: Nov. 17, 2009

(65) Prior Publication Data

US 2010/0068961 A1 Mar. 18, 2010

Related U.S. Application Data

(62) Division of application No. 11/322,987, filed on Dec. 30, 2005, now Pat. No. 7,638,160.

(51) Int. Cl.
  *B05D 3/02* (2006.01)
(52) U.S. Cl. ................................ 427/387; 427/389.8
(58) Field of Classification Search .................. None
  See application file for complete search history.

(56) References Cited

U.S. PATENT DOCUMENTS

| | | | | |
|---|---|---|---|---|
| 3,081,195 A * | 3/1963 | Biefeld et al. | ................. | 428/391 |
| 3,168,389 A * | 2/1965 | Eilerman | ...................... | 428/378 |
| 3,437,517 A * | 4/1969 | Eilerman et al. | .............. | 428/392 |
| 3,454,454 A * | 7/1969 | Marsden et al. | .............. | 442/173 |
| 4,477,496 A * | 10/1984 | Das et al. | ........................ | 427/375 |
| 5,108,798 A * | 4/1992 | Guerro et al. | ............. | 427/389.8 |
| 5,322,881 A * | 6/1994 | Yamamoto et al. | ........... | 524/504 |
| 5,437,928 A * | 8/1995 | Thimons et al. | .............. | 428/391 |
| 5,505,998 A * | 4/1996 | Mathews et al. | ........... | 427/389.8 |
| 5,661,213 A * | 8/1997 | Arkens et al. | .................. | 524/555 |
| 6,331,350 B1 * | 12/2001 | Taylor et al. | .................. | 428/221 |
| 6,593,420 B1 * | 7/2003 | Helbing | ....................... | 524/596 |
| 7,270,853 B2 * | 9/2007 | Rodrigues et al. | ......... | 427/389.8 |
| 7,642,306 B2 * | 1/2010 | Charbonneau et al. | ....... | 524/284 |
| 2002/0055313 A1 * | 5/2002 | Velpari et al. | ................. | 442/180 |
| 2006/0057919 A1 * | 3/2006 | Xing et al. | .................... | 442/180 |

OTHER PUBLICATIONS

Clamen et al, Non Wovens World, pp. 96-102, Apr.-May 2004.*

* cited by examiner

*Primary Examiner* — Erma Cameron
(74) *Attorney, Agent, or Firm* — Robert D. Touslee

(57) ABSTRACT

A method for reducing the amount of binder or resin used in glass fiber manufacturing while maintaining product performance is disclosed. The method generally reduces the amount of binder or resin used in a manufacturing process by adjusting other factors in the manufacturing process. Specifically, ramp moisture and/or silane content are factors that are adjusted to achieve the results of the disclosed method. Additionally, glass fiber compositions resulting from the method are disclosed.

7 Claims, 9 Drawing Sheets

Minitab ANOVA output for rigidity following 7 days of sag room aging.

Figure 1. Minitab ANOVA output for quick rigidity by run.

One-way ANOVA: Runs 1 through16

```
Analysis of Variance
Source     DF         SS         MS         F         P
Factor     15     71.727      4.782     16.32     0.000
Error      80     23.433      0.293
Total      95     95.160
                                      Individual 95% CIs For Mean
                                      Based on Pooled StDev
Run        N        Mean      StDev   ---------+---------+---------+-------
1          6      2.4500     0.9354          (--*---)
2          6      2.7167     0.6555            (---*--)
3          6      3.4167     0.6494                    (--*---)
4          6      3.7667     0.3445                       (--*---)
5          6      4.2667     0.4179                            (---*--)
6          6      5.3833     0.4446                                      (---*---)
7          6      3.1833     0.4916                  (---*--)
8          6      2.0167     0.5231     (---*--)
9          6      2.9333     0.6250              (--*---)
10         6      2.8333     0.7840              (---*--)
11         6      2.5333     0.3445          (---*---)
12         6      1.8667     0.3204     (---*--)
13         6      3.0500     0.4324                (--*---)
14         6      2.7667     0.4967            (---*---)
15         6      2.7500     0.2168            (---*---)
16         6      2.0667     0.4967      (--*---)
                                      ---------+---------+---------+-------
Pooled StDev =     0.5412                     2.4        3.6        4.8
```

Figure 2. Reduced model for quick rigidity.

Response Surface Regression: QKdrp versus Ramp Moisture, Resin Flow, Silane Flow

The analysis was done using uncoded units.

Estimated Regression Coefficients for QKdrp

| Term | Coef | SE Coef | T | P |
|---|---|---|---|---|
| Constant | 9.43288 | 0.91427 | 10.317 | 0.000 |
| Ramp Moisture | -1.52930 | 0.26750 | -5.717 | 0.000 |
| Resin Flow | -0.55716 | 0.17961 | -3.102 | 0.011 |
| Silane Flow | -1.92272 | 0.76696 | -2.507 | 0.031 |
| Ramp Moisture*Ramp Moisture | 0.08613 | 0.02362 | 3.647 | 0.004 |
| Ramp Moisture*Silane Flow | 0.36875 | 0.14667 | 2.514 | 0.031 |

$S = 0.3319$   $R\text{-}Sq = 90.8\%$   $R\text{-}Sq(adj) = 86.2\%$

Analysis of Variance for QKdrp

| Source | DF | Seq SS | Adj SS | Adj MS | F | P |
|---|---|---|---|---|---|---|
| Regression | 5 | 10.8332 | 10.83325 | 2.16665 | 19.67 | 0.000 |
| Linear | 3 | 8.6718 | 4.66142 | 1.55381 | 14.11 | 0.001 |
| Square | 1 | 1.4652 | 1.46521 | 1.46521 | 13.30 | 0.004 |
| Interaction | 1 | 0.6962 | 0.69620 | 0.69620 | 6.32 | 0.031 |
| Residual Error | 10 | 1.1014 | 1.10145 | 0.11014 | | |
| Lack-of-Fit | 9 | 1.1010 | 1.10100 | 0.12233 | 271.85 | 0.047 |
| Pure Error | 1 | 0.0005 | 0.00045 | 0.00045 | | |
| Total | 15 | 11.9347 | | | | |

Unusual Observations for QKdrp

| Obs | StdOrder | QKdrp | Fit | SE Fit | Residual | St Resid | |
|---|---|---|---|---|---|---|---|
| 6 | 9 | 5.380 | 4.936 | 0.254 | 0.444 | 2.08 | R |

R denotes an observation with a large standardized residual.

Figure 3A. Contour plots of the reduced model for quick rigidity - Resin Flow*Ramp Moisture.
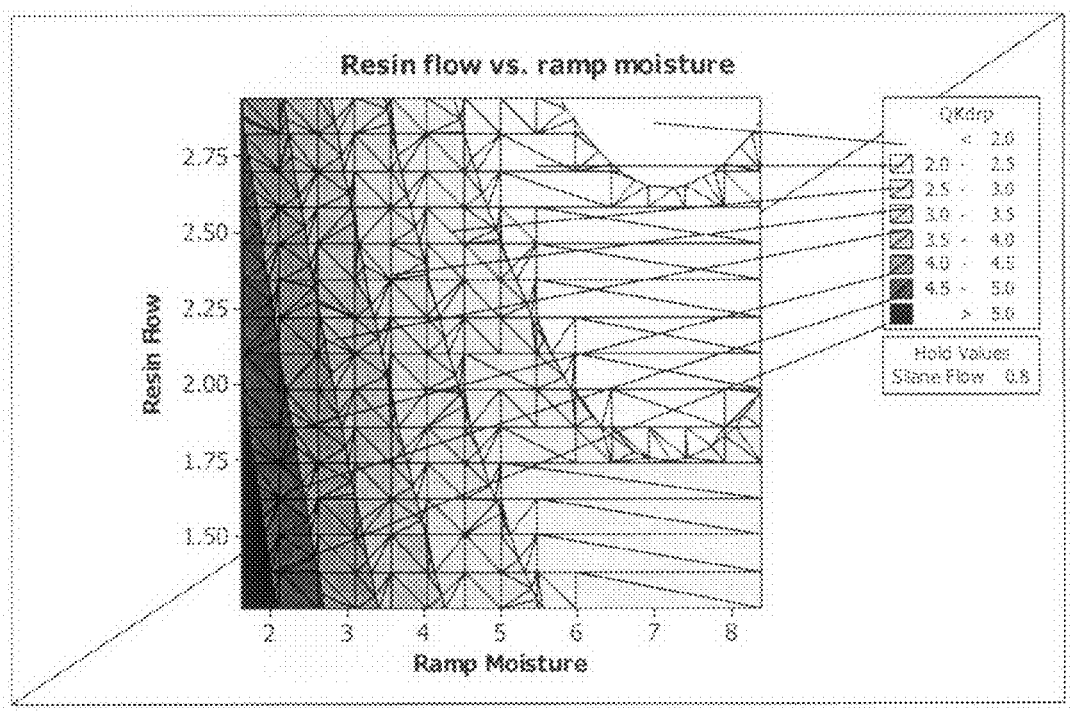

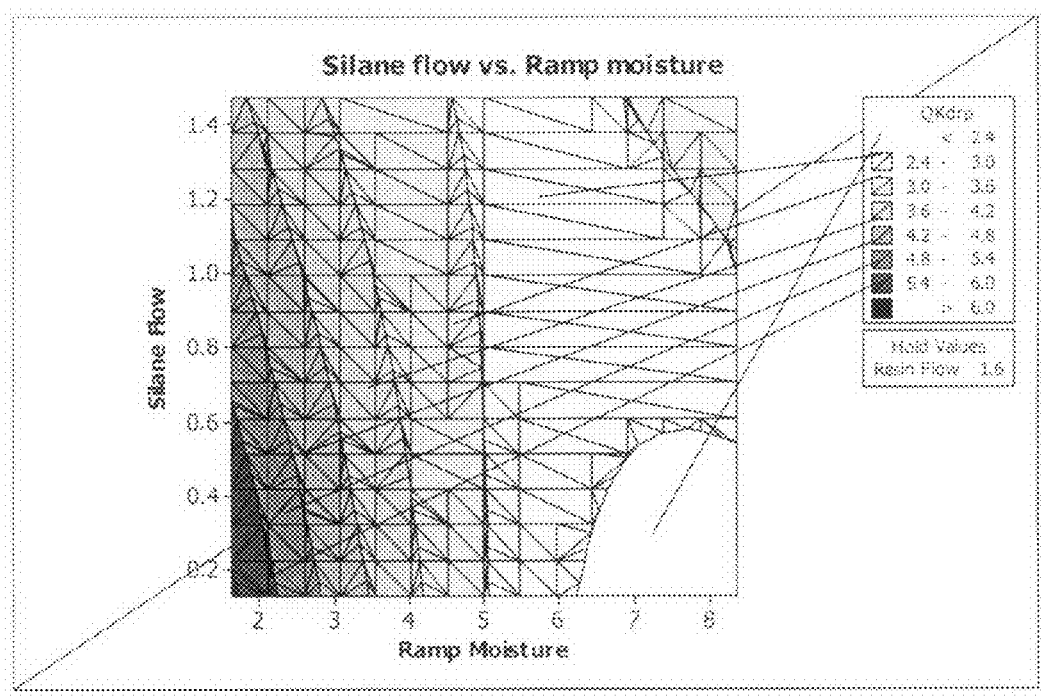
Figure 3B. Contour plots of the reduced model for quick rigidity – Silane Flow*Ramp Moisture.

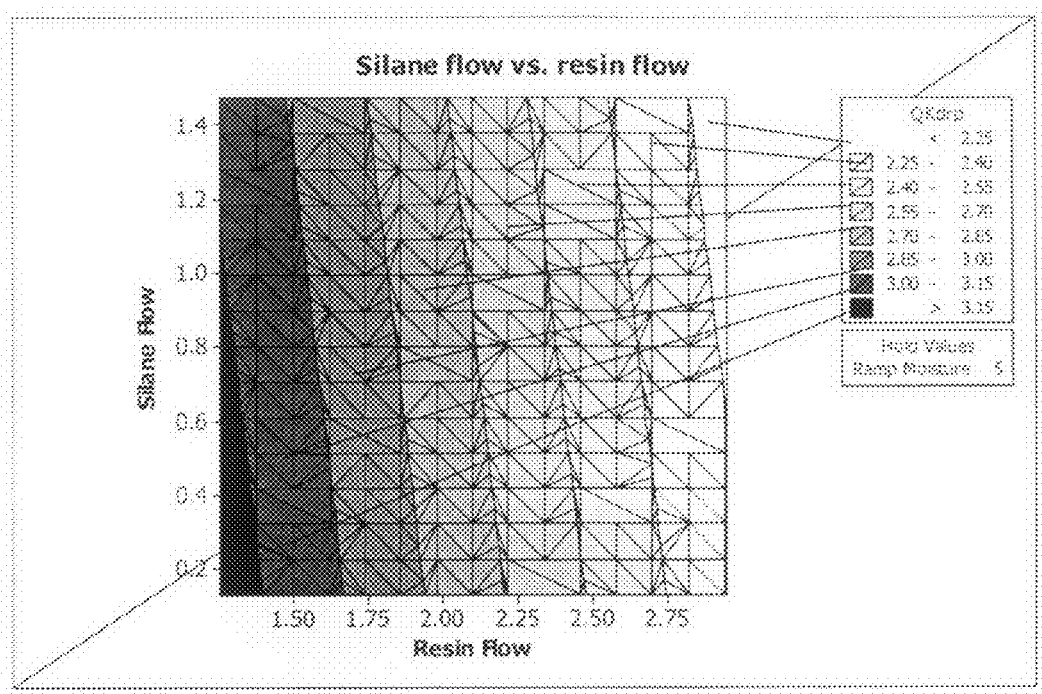
Figure 3C. Contour plots of the reduced model for quick rigidity - Silane Flow*Resin Flow.

Figure 4. Minitab ANOVA output for rigidity following 7 days of sag room aging.

One-way ANOVA: Droop32 versus Desc

```
Source   DF      SS      MS      F       P
Desc     15   217.14   14.48   14.40   0.000
Error   368   370.02    1.01
Total   383   587.16

S = 1.003   R-Sq = 36.98%   R-Sq(adj) = 34.41%

Individual 95% CIs For Mean Based on
                              Pooled StDev
Level   N    Mean   StDev   -------+---------+---------+---------+--
SP1    24   3.938   1.235    (---*---)
SP10   24   5.500   1.186                   (---*---)
SP11   24   4.404   0.532        (---*---)
SP12   24   3.671   0.760   (---*---)
SP13   24   4.883   0.937             (---*---)
SP14   24   4.121   0.525     (---*---)
SP15   24   4.488   1.011        (---*---)
SP16   24   3.704   0.575   (---*---)
SP2    24   4.067   0.635     (---*---)
SP3    24   4.779   0.797            (---*---)
SP4    24   5.029   0.750              (---*---)
SP5    24   5.746   1.558                      (---*---)
SP6    24   6.279   1.685                          (---*---)
SP7    24   3.904   0.472    (---*---)
SP8    24   3.775   0.439   (---*---)
SP9    24   4.463   1.584        (---*---)
                            -------+---------+---------+---------+--
                                 4.0       5.0       6.0       7.0

Pooled StDev = 1.003
```

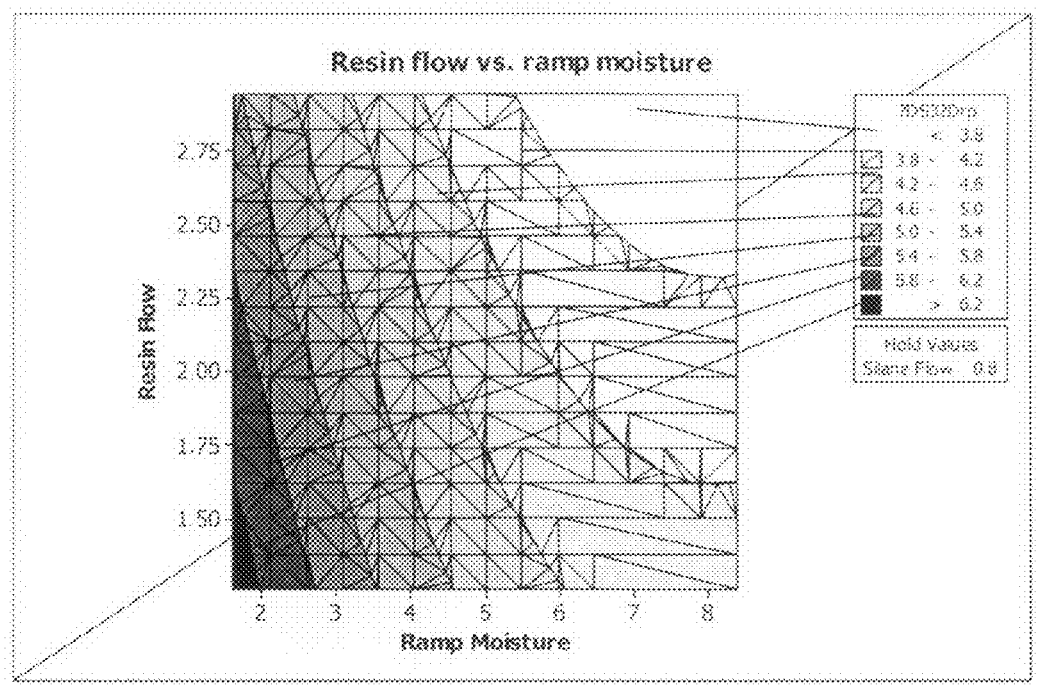
Figure 5A. Contour plots of product rigidity following 7 days of aging at 90°F and 90% humidity - Resin Flow*Ramp Moisture.

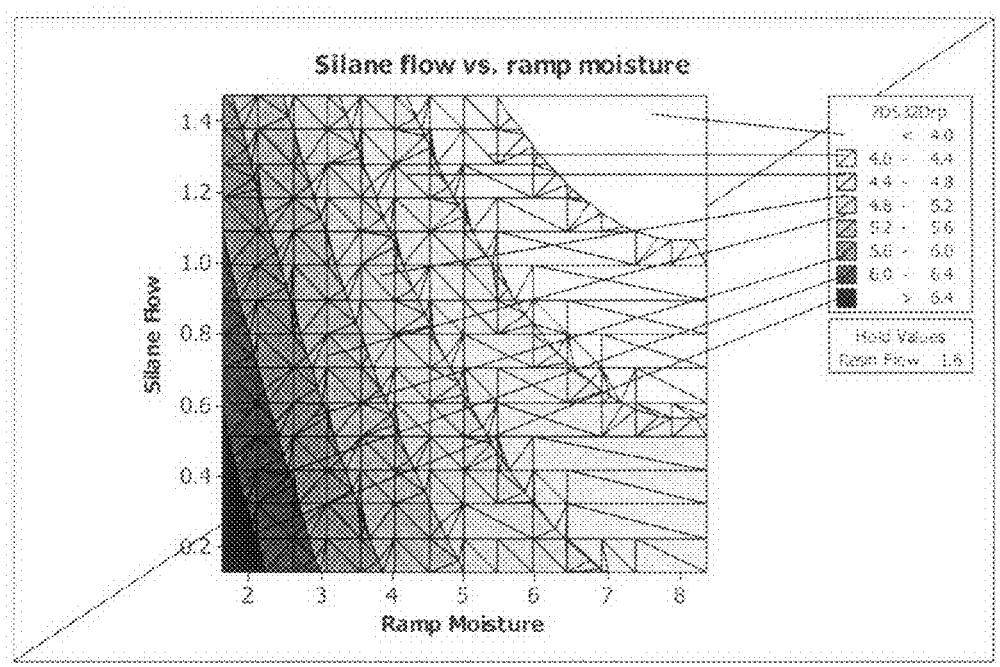
Figure 5B. Contour plots of product rigidity following 7 days of aging at 90°F and 90% humidity - Silane Flow*Ramp Moisture.

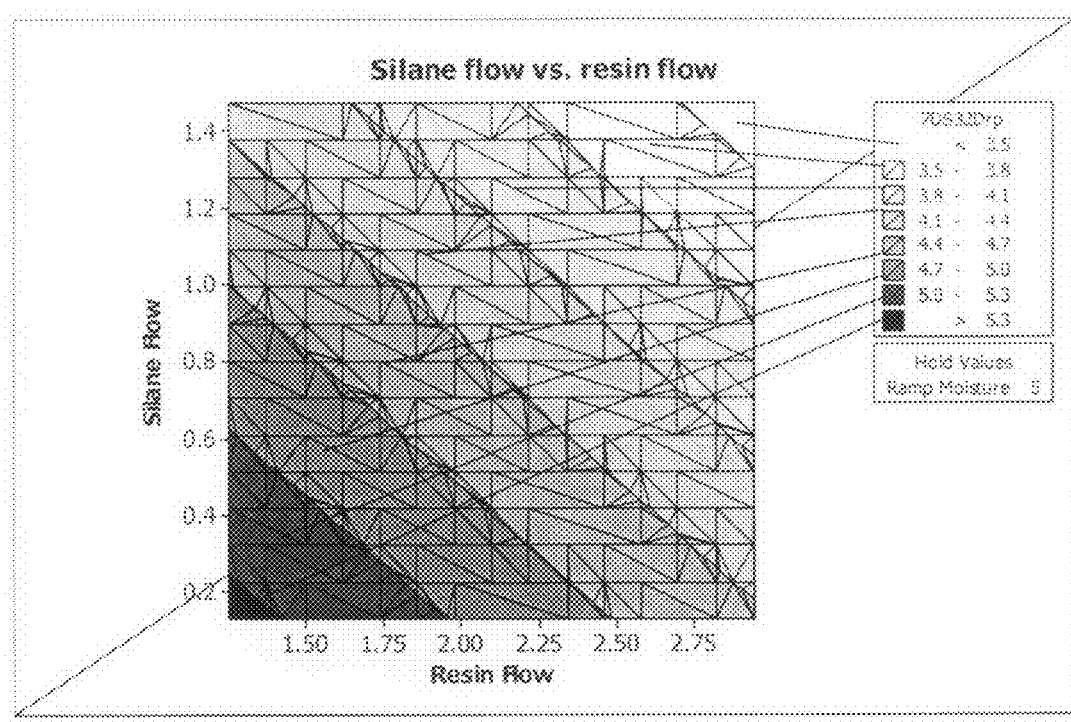
Figure 5C. Contour plots of product rigidity following 7 days of aging at 90°F and 90% humidity - Silane Flow*Resin Flow.

METHOD FOR PRODUCING FIBERGLASS MATERIALS AND COMPOSITIONS RESULTING FROM THE SAME

This application is a division of application Ser. No. 11/322,987 filed Dec. 30, 2005 now U.S. Pat. No. 7,638,160. Fibrous glass insulation ("fiberglass" or "glass fiber" insulation) products generally comprise matted glass fibers bonded together by a binder that is often a cured thermoset polymeric material. Molten streams of glass are drawn into fibers of random lengths and blown into a forming chamber where they are randomly deposited as a mat onto a traveling conveyor. The fibers, while in transit in the forming chamber, and while often still hot from the drawing operation are sprayed with the binder. The coated fibrous mat is transferred to a curing oven where heated air, for example, is blown through the mat to cure the binder and rigidly bond the glass fibers together.

BACKGROUND

Fiberglass binders have a variety of uses ranging from stiffening applications where the binder is applied to woven or non-woven fiberglass sheet goods and cured, producing a stiffer product; thermo-forming applications wherein the binder resin is applied to sheet or lofty fibrous product following which it is dried and optionally B-staged to form an intermediate but yet curable product; and to fully cured systems such as building insulation.

Binders useful in fiberglass insulation products generally require a low viscosity in the uncured state, yet characteristics so as to form a rigid thermoset polymeric mat for the glass fibers when cured. A binder which forms a rigid matrix when cured is required so that a finished fiberglass thermal insulation product, when compressed for packaging and shipping, will recover to its specified vertical dimension when installed in a building.

From among the many thermosetting polymers, numerous candidates for suitable thermosetting fiber-glass binder resins exist. However, binder-coated fiberglass products are often of the commodity type, and thus cost becomes a driving factor, generally ruling out such resins as thermosetting polyurethanes, epoxies, and others. Due to their excellent cost/performance ratio, the resins of choice in the past have been phenol/formaldehyde resins. Phenol/formaldehyde resins can be economically produced, and can be extended with urea prior to use as a binder in many applications. Such urea-extended phenol/formaldehyde binders have been the mainstay of the fiberglass insulation industry for years.

Over the past several decades, however, minimization of volatile organic compound emissions (VOCs) both on the part of the industry desiring to provide a cleaner environment, as well as by Federal regulation, has led to extensive investigations into not only reducing emissions from the current formaldehyde-based binders, but also reducing the amount of binder used in production. Increasing stringent Federal regulations has lead to greater attention to alternative binder systems which are free from formaldehyde.

One particularly useful formaldehyde-free binder system employs a binder comprising a polycarboxy polymer and a polyol. Formaldehyde-free resins are those which are not made with formaldehyde or formaldehyde-generating compounds. Formaldehyde-free resins, such as acrylic resins, do not emit appreciable levels of formaldehyde during the insulation manufacturing process and do not emit formaldehyde under normal service conditions. Use of this binder system in conjunction with a catalyst, such as an alkaline metal salt of a phosphorous-containing organic acid, results in glass fiber products that exhibit excellent recovery and rigidity properties.

Fiberglass products, such as fiberglass insulation, are exposed to a variety of environmental conditions that can adversely affect the performance of the product. Overall rigidity and recovery of the product are typical measures of performance.

Curing of the fiberglass products is essential to proper product performance. Factors that contribute to the curing process, and the ultimate performance of the fiberglass product, include many variables, and ultimate product performance is often unpredictable.

There is a need for reducing the quantity of acrylic resin used in binder systems during the manufacture of fiber glass insulation products without negatively impacting the curing process or the overall performance of the product.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

The method provides for reducing the amount of acrylic binder or resin used in glass fiber manufacturing while maintaining product performance. One method for reducing the amount of acrylic resin used in glass fiber manufacturing maximizes ramp moisture, operating between 5 and 20 percent. Another method for reducing the amount of acrylic resin used in glass fiber manufacturing maximizes the use of silane, operating between 0.019% and 0.350% solid per weight of glass (between 0.20% and 3.64% per weight resin solids). Most preferably, a method for reducing the amount of acrylic resin used in glass fiber manufacturing maximizes the use of silane, operating between 0.70% and 0.26% solid per weight of glass (between 0.8% and 2.7% per weight resin solids). Increasing ramp moisture and increasing silane levels in the binder were discovered to reduce the amount of acrylic-based binder required to manufacture glass fiber material while maintaining or improving product performance. Relatedly, increasing either ramp moisture or silane levels were discovered to reduce the amount of acrylic-based binder required to produce glass fiber material while maintaining product performance.

The foregoing has outlined rather broadly the features and technical advantages of the present invention in order that the detailed description of the invention that follows may be better understood. Additional features and advantages of the methods and compositions disclosed herein will be described hereinafter which form the subject of the claims of the invention. It should be appreciated that the conception and specific embodiment disclosed may be readily utilized as a basis for modifying or designing other structures for carrying out the same purposes of the methods and compositions disclosed herein. It should also be realized that such equivalent constructions do not depart from the methods and compositions disclosed herein. The novel features which are believed to be characteristic of the methods and compositions disclosed herein, both as to its organization and method of operation, together with further objects and advantages will be better understood from the following description.

In addition to the exemplary aspects and embodiments described above, further aspects and embodiments will become apparent by reference to the drawings and tables and by study of the following descriptions.

BRIEF DESCRIPTION OF THE DRAWINGS

Exemplary embodiments are illustrated in the referenced figures of the drawings. It is intended that the embodiments and figures disclosed herein are to be considered illustrative rather than limiting.

FIG. 1 is an analysis of variance representing measurements of the rigidity of a product manufactured according to a method disclosed herein.

FIG. 2 is a reduced model for rigidity measurements of a product manufactured according to a method disclosed herein. The response surface regression of FIG. 2 plots QKdrp vs. ramp moisture, resin flow, and silane flow.

FIG. 3A is a contour plot of product rigidity for resin flow (y-axis) (L/min) vs. ramp moisture (x-axis) (%).

FIG. 3B is a contour plot of product rigidity for silane flow (y-axis) (L/min) vs. ramp moisture (x-axis) (%).

FIG. 3C is a contour plot of product rigidity for silane flow (y-axis) (L/min) vs. resin flow (y-axis) (L/min).

FIG. 4 is an analysis of variance for product rigidity following seven (7) days of aging at 90° F. and 90% humidity.

FIG. 5A is a contour plot of product rigidity following seven (7) days of aging at 90° F. and 90% humidity for resin flow (y-axis) (L/min) vs. ramp moisture (x-axis) (%).

FIG. 5B is a contour plot of product rigidity following seven (7) days of aging at 90° F. and 90% humidity for silane flow (y-axis) (L/min) vs. ramp moisture (x-axis) (%).

FIG. 5C is a contour plot of product rigidity following seven (7) days of aging at 90° F. and 90% humidity for silane flow (y-axis) (L/min) vs. resin flow (y-axis) (L/min).

DETAILED DESCRIPTION

It has been discovered that fiber glass insulation product properties may be improved or maintained when manufactured under conditions of increased overall ramp moisture and/or increased silane content, while reducing amounts of resin or binder. The improvement in rigidity after aging of the fiber glass insulation product manufactured with increased silane flow as described herein was unexpected.

Structural integrity and physical properties of glass fiber products overall are related to, amongst other things, curing of binders or resins which hold the glass fibers together and provide stiffness and resiliency to the products. The effectiveness of the binder composition is due in large measure to how well the binder is cured. This is particularly true for novel formaldehyde-free binder compositions that are currently being used by fiberglass manufacturers. Physical properties of manufactured glass fiber products are dependant upon, amongst other things, the temperature of the binder resin during the curing step, the length of time that the temperature is maintained, and the silane content of the binder.

The methods and compositions described herein are particularly useful for ensuring that properties of manufactured glass fiber products are maintained or improved when using formaldehyde-free binders, including, but not limited to, acrylic thermoset binders, while reducing the amount of binder used in the manufacturing process. The formaldehyde-free binders useful in the practice of the methods and compositions disclosed herein are typically prepared from resins comprising poly-carboxy polymers such as acrylic resins, although other formaldehyde-free resins may be employed. As used herein, the term "formaldehyde-free" or "FF" means that the resin or binder composition is substantially free of formaldehyde and/or does not liberate formaldehyde as a result of curing or drying. FF binders and resins generally have a molecular weight of less than about 10,000, preferably less than about 5,000.

In one embodiment, the polycarboxy polymer used in the formaldehyde-free binder comprises an organic polymer or oligomer containing more than one pendant carboxy group. The polycarboxy polymer may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaeonic acid, α-β-methyleneglutaric acid, and the like. Alternatively, the polycarboxy polymer may be prepared from unsaturated anhydrides including, but not necessarily limited to, maleic anhydride, methacrylic anhydride, and the like, as well as mixtures thereof. Methods for polymerizing these acids and anhydrides are well-known in the chemical art.

In one embodiment, the formaldehyde-free curable aqueous binder composition also contains a polyol containing at least two hydroxyl groups. The polyol must be sufficiently nonvolatile such that it will substantially remain available for reaction with the polyacid in the composition during heating and curing operations. The polyol may be a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, β-hydroxyalkylamides such as, for example, bis[N,N-di(β-hydroxyethyl)] adipamide, as may be prepared according to the teachings of U.S. Pat. No. 4,076,917, incorporated herein by reference, or it may be an addition polymer containing at least two hydroxyl groups such as, for example, polyvinyl alcohol, partially hydrolyzed polyvinyl acetate, and homopolymers or copolymers of hydroxyethyl(meth)acrylate, hydroxypropyl (meth)acrylate, and the like. The most preferred polyol for the purposes of the present invention is triethanolamine (TEA), or mixtures of DEA and TEA.

The ratio of the number of equivalents of carboxy, anhydride, or salts thereof of the polyacid to the number of equivalents of hydroxyl in the polyol is from about 1/0.01 to about 1/3. An excess of equivalents of carboxy, anhydride, or salts thereof of the polyacid to the equivalents of hydroxyl in the polyol is preferred. The more preferred ratio of the number of equivalents of carboxy, anhydride, or salts thereof in the polyacid to the number of equivalents of hydroxyl in the polyol is from about 1/0.4 to about 1/1. The most preferred ratio of the number of equivalents of carboxy, anhydride, or salts thereof in the polyacid to the number of equivalents of hydroxyl in the polyol is from about 1/0.6 to about 1/0.8, and most preferably from 1/0.65 to 1/0.75. A low ratio, approaching 0.7:1, has been found to be of particular advantage in the present invention, when combined with a low molecular weight polycarboxy polymer and the low pH binder.

The formaldehyde-free curable aqueous binder composition may also contain a catalyst, such as, for example, a phosphorous-containing accelerator which may be a compound with a molecular weight less than about 1000 such as, for example, an alkali metal polyphosphate, an alkali metal dihydrogen phosphate, a polyphosphoric acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. Such a phosphorous-containing accelerator may be used at a level of from about 1% to about 40%, by weight based on the combined weight of the polyacid and the polyol.

The binder compositions described herein are usually supplied as an aqueous suspension containing about 48 to 53 wt % solids and are prepared by first further diluting the binder to a point where the composition contains from about 1 to about 10 percent solids.

Acid is then added to the aqueous binder composition to reduce the pH to a less than about 3.5, preferably less than 3.0, much preferably less than 2.5. Low pH has been found to be important in ensuring proper application and curing of the binder composition.

Curing of the binders is most often accomplished by heating the binder coated fibers in a curing oven. Curing ovens typically are arranged with one or more temperature zones of varying ramp moistures. In each zone, the binder-coated fibers are subjected to a temperature in the range of 150° C. to 325° C. with from 180 to 250° C. preferred. Air is also forced through the fiberglass product by fans associated with each zone to ensure uniform heating of the fiberglass product.

Use of silane adhesion promoters often is utilized when employing a binder for a glass mat. Identifying appropriate adhesion promoters for thermosetting acrylic resin-based binder compositions might also be helpful in delivering a more useful fiberglass binder. The presence of the ethoxysilane has been found to impart good hydrolytic stability to the binder, and hence the fiberglass mat to which the binder is applied. As well, the use of an ethoxysilane, as opposed to other silanes, avoids harmful emissions such as methanol, which is recognized as a HAP (hazardous air pollutant). As a result, fiberglass products such as insulation made with the binder of the methods and compositions disclosed herein provide a competitive advantage as the products will meet advertised thickness so as to make the required R value, and also have good recovery and rigidity properties, and good hydrolytic stability, and a reduction in the amount of resin or binder used in the manufacturing process. The use of various silanes as adhesion promoters in binders used in the production of glass fiber-based materials is discussed by Guy Clamen, et al., "Acrylic Thermosets: A Green Chemistry Alternative to Formaldehyde Resins," International Nonwovens Technical Conference, Baltimore, Md., Sep. 15-18, 2003.

Silanes are monomeric silicon compounds with four substituent groups attached to the silicon atom and are commercially available from chemical companies such as Dow Corning and GE Silicones. Silane compounds are believed to act as an adhesion promoter of the binder to the fiberglass by a coupling mechanism. Silane reacts with the thermoset polycarboxy molecule and attaches to the glass fiber substrate. If an appropriate silane is chosen, it has been found that the properties of the polycarboxy based binder, and hence the fiberglass product, can be enhanced.

The silanes of the methods and compositions disclosed herein are ethoxysilanes. The ethoxysilanes generally do not contain a vinyl group, and preferably contain an epoxy or glycidoxy group. A mixture of ethoxysilanes can be employed. Among the most preferred ethoxysilanes are the diethoxysilanes such as, glycidoxy or epoxydiethoxysilane, and triethoxysilane, which have been found to provide good results when used in combination with a polycarboxy/polyol binder system. A polycarboxy based binder system containing an ethoxysilane also has the advantage of good hydrolytic stability under hot, humid conditions. Thus, the good physical performance of such binders can be realized regardless of the environmental conditions, which provides a real competitive advantage. The ethoxysilanes used in the binder compositions of the methods and compositions disclosed herein also result in no harmful emissions, as none of the emissions are considered a HAP (hazardous air pollutant). The combination of good physical properties and environmental acceptability offered by the use of ethoxysilanes in the binder compositions of the methods and compositions disclosed herein is truly advantageous to the industry. Further reducing the amount of binder composition used in the manufacturing process is also advantageous.

The formaldehyde-free curable aqueous binder composition may contain, in addition, conventional treatment components such as, for example, emulsifiers, pigments, filler, anti-migration aids, curing agents, coalescents, wetting agents, biocides, plasticizers, anti-foaming agents, colorants, waxes, and anti-oxidants.

The formaldehyde-free curable aqueous binder composition may be prepared by admixing the polyacid, the polyol, and the phosphorous-containing accelerator using conventional mixing techniques. In another embodiment, a carboxyl- or anhydride-containing addition polymer and a polyol may be present in the same addition polymer, which addition polymer would contain both carboxyl, anhydride, or salts thereof functionality and hydroxyl functionality. In another embodiment, the salts of the carboxy-group are salts of functional alkanolamines with at least two hydroxyl groups such as, for example, diethanolamine, triethanolamine, dipropanolamine, and di-isopropanolamine. In an additional embodiment, the polyol and the phosphorous-containing accelerator may be present in the same addition polymer, which addition polymer may be mixed with a polyacid. In yet another embodiment the carboxyl- or anhydride-containing addition polymer, the polyol, and the phosphorous-containing accelerator may be present in the same addition polymer. Other embodiments will be apparent to one skilled in the art. As disclosed herein-above, the carboxyl groups of the polyacid may be neutralized to an extent of less than about 35% with a fixed base before, during, or after the mixing to provide the aqueous composition. Neutralization may be partially effected during the formation of the polyacid.

Once the composition of the polyacid and the polyol has been prepared, the ethoxysilane can then be mixed in with or simply added to the composition to form the final binder composition to be sprayed on the fiberglass. The ethoxysilane is therefore basically an important additive to conventional polycarboxy binder systems, such as that described in U.S. Pat. No. 6,331,350, which is hereby expressly incorporated by reference in its entirety. As molten streams of glass are drawn into fibers of random lengths and blown into a forming chamber where they are randomly deposited as a mat onto a traveling conveyor, the fibers, while in transit in the forming chamber, are sprayed with the aqueous binder composition of the methods and compositions disclosed herein, which includes the ethoxysilane.

More particularly, in the preparation of fiberglass insulation products, the products can be prepared using conventional techniques. As is well known, a porous mat of fibrous glass can be produced by fiberizing molten glass and immediately forming a fibrous glass mat on a moving conveyor. The expanded mat is then conveyed to and through a curing oven wherein heated air is passed through the mat to cure the resin. The mat is slightly compressed to give the finished product a predetermined thickness and surface finish. Typically, the curing oven is operated at a temperature from about 150° C. to about 325° C. Preferably, the temperature ranges from about 180 to about 225° C. Generally, the mat resides within the oven for a period of time from about ½ minute to about 3 minutes. For the manufacture of conventional thermal or acoustical insulation products, the time ranges from about ¾ minute to about 2 minutes. The fibrous glass having a cured, rigid binder matrix emerges from the oven in the form of a bat or roll which may be compressed for packaging and shipping and which will thereafter substantially recover its thickness when unconstrained.

The formaldehyde-free curable aqueous composition may also be applied to an already formed nonwoven by conventional techniques such as, for example, air or airless spraying, padding, saturating, roll coating, curtain coating, beater deposition, coagulation, or the like.

The waterborne formaldehyde-free silane-containing composition, after it is applied to a nonwoven, is heated to effect drying and curing. The duration and temperature of heating will affect the rate of drying, ramp moisture, processability and handleability, and property development of the treated substrate. Heat treatment at about 120° C., to about 400° C., for a period of time between about 3 seconds to about 15 minutes may be carried out; treatment at about 150° C., to about 250° C., is preferred. The drying and curing functions may be effected in two or more distinct steps, if desired. For example, the composition may be first heated at a temperature and for a time sufficient to substantially dry but not to substantially cure the composition and then heated for a second time at a higher temperature and/or for a longer period of time to effect curing. Such a procedure, referred to as "B-staging," may be used to provide binder-treated nonwoven, for example, in roll form, which may at a later stage be cured, with or without forming or molding into a particular configuration, concurrent with the curing process.

The heat-resistant nonwovens may be used for applications such as, for example, insulation batts or rolls, as reinforcing mat for roofing or flooring applications, as roving, as microglass-based substrate for printed circuit boards or battery separators, as filter stock, as tape stock, as tape board for office partitions, in duct liners or duct board, and as reinforcement scrim in cementitious and non-cementitious coatings for masonry. Due to the good hydrolytic stability of the binders and good humid aging performance, products prepared using the methods disclosed herein can be used under varying environmental conditions.

Measurement of rigidity generally involves preparing a specimen of fiberglass product for testing, placing the specimen in contact with water and determining the water resistance of the specimen. The water resistance can be determined by either qualitative or quantitative techniques. Measurement of rigidity can be used to evaluate the water resistance of fiberglass products where its ability to resist water affects the products performance. Methods for evaluating the water resistance of binder-coated fiberglass products are disclosed in co-pending U.S. application Ser. No. 10/887,023, filed by Ward Hobert et al., on Jul. 9, 2004, and incorporated by reference herein in its entirety.

We conclude that resin usage can be reduced in a manufacturing process that increases silane and/or ramp moisture. These increases in ramp moisture and/or silane flow will enable reduced costs in a fiberglass manufacturing system. It is important to note that the effect of silane is improved product durability. It is possible to reduce resin usage significantly while maintaining equal or improved product performance. By maximizing ramp moisture, operating between 5 and 20 percent, we can reduce resin usage while improving product performance. By maximizing the use of silane, operating between 0.019% and 0.350% solid per weight of glass (between 0.20% and 3.64% per weight resin solids), and most preferably, between 0.70% and 0.26% solid per weight of glass (between 0.8% and 2.7% per weight resin solids), we can reduce the amount of acrylic resin used in glass fiber manufacturing while maintaining or improving product performance.

EXAMPLES

The following is offered as an example of the invention and should not be construed as limiting the invention.

Through the use of a designed experiment and subsequent product aging and testing, an opportunity was observed that will reduce resin system cost in plants operating on the acrylic resin systems. Based upon the product rigidity measurements for both quick (in-plant) and following 7 days of aging at 90° F. and 90% humidity, increases in ramp moisture and/or silane usage provided an opportunity to reduce resin usage and therefore product cost. Product recovery met or exceeded label thickness throughout the trial for both the quick and aged products and was not found to be significant to any of the process variables manipulated.

Trials were performed at one or more manufacturing plant with a design to improve the cost and performance of insulation products manufactured with formaldehyde-free binders. The trials disclosed herein focused on three (3) factors identified as having the significance to product performance. Manipulation of ramp moisture, resin flow and silane flow were investigated using a central-composite designed experiment. During the execution of the trial the product performance varied significantly with the process adjustments. FIG. 1 represents an analysis of variance ("ANOVA") of the quick rigidity measurements by run.

As observed in the ANOVA results, there were significant differences between product runs. Also, runs 2 and 15 were center points for the experiment and are statistically identical suggesting no drifting occurred during the 8 hour trial. Analysis of the experiment suggested that three factors (ramp moisture, silane flow, and resin flow) were significant to product performance. A reduced model of quick rigidity is presented in FIG. 2. The analysis suggests that all three factors are significant to quick rigidity. FIG. 3 represents a contour plot of quick rigidity for each of the three combinations of factors.

Interpretation of FIG. 3 leads to a conclusion that increased ramp moisture and/or silane flow will allow for reductions in resin flow while maintaining acceptable product performance. The results of the trials suggest that there is opportunity to reduce resin usage provided that silane levels are increased while maintaining or increasing ramp moisture. The reduced model depicted in FIG. 3, and shown in FIG. 2, predicted product rigidity with and RSQ of 90.8%.

Similar to the quick product performance analysis, an ANOVA was performed for rigidity following 7 days of sag room aging. FIG. 4 represents the output for the ANOVA performed on product aged 7 days at 90° F. and 90% humidity. As was observed in the quick product performance, the product aged 7 days also showed significant differences based on the process settings. Also, similar to the quick performance, runs 2 and 15 were statistically the same suggesting a minimum amount of process drift occurred during the 8-hour trial. Recovery for the products at both quick and 7 days of sag room aging met or exceeded label thickness and were not found to be significant to any of the factors manipulated in the experiment.

Following the ANOVA analysis shown in FIG. 4, analysis of the experiment was performed. FIG. 5 represents a contour plot for the reduced model. As with quick rigidity, all factors were significant to product performance following 7 days at 90° F. and 90% humidity.

Through interpretation of FIG. 5, we conclude that resin usage can be reduced in a manufacturing process that increases silane flow and/or ramp moisture. These increases in ramp moisture and/or silane flow will enable a reduced manufacturing system cost. It is important to note that the effect of silane is improved product durability when reduced amounts of acrylic-based binder are used.

Through the analysis of the responses displayed above, we conclude that it is possible to reduce resin usage significantly while maintaining equal or improved product performance. By maximizing ramp moisture, operating between 5 and 20 percent we can reduce resin usage while improving product performance. By maximizing the use of silane, operating between 0.019% and 0.350% solid per weight of glass (between 0.20% and 3.64% per weight resin solids), and most preferably, between 0.70% and 0.26% solid per weight of glass (between 0.8% and 2.7% per weight resin solids), we can reduce the amount of acrylic resin used in glass fiber manufacturing by up to 30% while maintaining or improving product performance.

While a number of exemplary aspects and embodiments have been discussed above, those of skill in the art will recognize certain modifications, permutations, additions, and subcombinations thereof. It is therefore intended that claims hereafter introduced are interpreted to include all such modifications, permutations, additions, and sub-combinations as are within their spirit and scope.

What is claimed is:

1. A method comprising:
   a) forming a glass fiber substrate;
   b) applying a binder composition to the glass fiber substrate to form an uncured glass fiber batt, wherein the binder comprises: i) a formaldehyde-free resin; and ii) an ethoxysilane, where the ethoxysilane is provided in an amount between 0.2% and 3.64% by weight of resin solids; and
   c) curing the glass fiber batt to form a glass fiber composite.

2. A method according to claim 1, wherein the formaldehyde-free resin is an acrylic resin.

3. A method according to claim 2, wherein the acrylic resin is prepared by admixing a polyacid and a polyol.

4. A method according to claim 2, wherein the acrylic resin is prepared by admixing a polyacid, and a polyol, and a phosphorous-containing accelerator.

5. The method according to claim 1, wherein the ethoxysilane comprises an epoxy group or a glycidoxy group.

6. A method comprising:
   a) forming a glass fiber substrate;
   b) applying a binder composition to the glass fiber substrate to form an uncured glass fiber batt, wherein the binder comprises: i) a formaldehyde-free acrylic resin; and ii) an ethoxysilane, where the ethoxysilane is provided in an amount between 0.8% and 2.7% by weight of resin solids; and
   c) curing the glass fiber batt to form a glass fiber composite.

7. The method according to claim 6, wherein the ethoxysilane comprises an epoxy group or a glycidoxy group.

* * * * *